(12) United States Patent
Kondou et al.

(10) Patent No.: US 9,712,006 B2
(45) Date of Patent: Jul. 18, 2017

(54) ROTOR AND ROTARY ELECTRIC MACHINE USING THE SAME

(75) Inventors: Toshinari Kondou, Shiga (JP); Yoshiki Yasuda, Shiga (JP); Akio Yamagiwa, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 560 days.

(21) Appl. No.: 14/008,386

(22) PCT Filed: Mar. 21, 2012

(86) PCT No.: PCT/JP2012/001949
§ 371 (c)(1),
(2), (4) Date: Sep. 27, 2013

(87) PCT Pub. No.: WO2012/132331
PCT Pub. Date: Oct. 4, 2012

(65) Prior Publication Data
US 2014/0021820 A1    Jan. 23, 2014

(30) Foreign Application Priority Data

Mar. 31, 2011    (JP) .................................. 2011-077880

(51) Int. Cl.
*H02K 1/27* (2006.01)
*H02K 1/24* (2006.01)

(52) U.S. Cl.
CPC .......... *H02K 1/276* (2013.01); *H02K 1/2766* (2013.01); *H02K 1/246* (2013.01); *H02K 2213/03* (2013.01)

(58) Field of Classification Search
CPC ............................ H02K 1/276; H02K 1/2766
See application file for complete search history.

(56) References Cited

U.S. PATENT DOCUMENTS

| | | | |
|---|---|---|---|
| 5,808,392 A | 9/1998 | Sakai et al. | |
| 2002/0175583 A1* | 11/2002 | Kikuchi | H02K 21/16 310/156.56 |
| 2002/0175584 A1 | 11/2002 | Koharagi et al. | |
| 2005/0285468 A1* | 12/2005 | Fukushima | H02K 1/2706 310/156.53 |
| 2006/0119205 A1* | 6/2006 | Sasaki | H02K 21/46 310/156.78 |

(Continued)

FOREIGN PATENT DOCUMENTS

| | | |
|---|---|---|
| EP | 1261104 A2 | 11/2002 |
| JP | 8-051751 A | 2/1996 |
| JP | 2002-354729 A | 12/2002 |

(Continued)

OTHER PUBLICATIONS

International Search Report issued in PCT/JP2012/001949, mailed on May 29, 2012.

(Continued)

*Primary Examiner* — Dang Le
(74) *Attorney, Agent, or Firm* — Birch, Stewart, Kolasch & Birch, LLP

(57) ABSTRACT

A first rotor core including a plurality of gaps penetrating through the first rotor core along an axial direction is provided. A second rotor core being in contact with an axial end of the first rotor core and having a plurality of magnet-housing slots facing the gaps is also provided. The gaps have a magnetic resistance lower than that of the magnet-housing slots.

8 Claims, 17 Drawing Sheets

(56) References Cited

U.S. PATENT DOCUMENTS

2010/0141074 A1* 6/2010 Podack .................. H02K 1/276
310/156.08
2013/0326855 A1* 12/2013 Ijspeert .................. H02K 1/276
29/428

FOREIGN PATENT DOCUMENTS

JP         2002-354730 A       12/2002
JP         2004-088852 A        3/2004

OTHER PUBLICATIONS

Supplementary European Search Report issued in PCT/JP2012/001949, mailed on Feb. 18, 2016.

* cited by examiner

ROTOR AND ROTARY ELECTRIC MACHINE USING THE SAME

TECHNICAL FIELD

The present invention relates to rotors including rotor cores equipped with magnets and rotary electric machines using such rotors.

BACKGROUND ART

Rotary electric machines, e.g., synchronous reluctance motors (SynRMs) employing auxiliary magnets, and interior permanent magnet motors (IPMs) include rotor cores equipped with magnets. Such a rotary electric machine occasionally shows reduction of magnetic force (i.e., demagnetization) of permanent magnets of the rotor core due to an application of a large opposing magnetic field caused for some reasons. To cope with this demagnetization, an increase in thickness of magnets, for example, may be effective. However, these measures disadvantageously lead to an increase in cost.

Another example of measures against demagnetization is devising the path of a magnetic flux (see, for example, Patent Document 1). In this example, a magnetic member is disposed on the surface of a permanent magnet. An end ring of a magnetic material magnetically coupled to a rotor core is disposed near an end of the magnetic member with a gap left therebetween.

CITATION LIST

Patent Document

[Patent Document 1] Japanese Unexamined Patent Publication No. H08-51751

SUMMARY OF THE INVENTION

Technical Problem

In the example of Patent Document 1, however, the presence of a gap between the rotor body and the end ring reduces a room for the rotor core when the conventional size of the whole motor is to be kept. That is, the rotor core is downsized, and performance degradation of the motor might occur. On the other hand, if the conventional size of the rotor core is kept, the size of the whole motor increases, causing the possibility of an increase in cost.

The present invention is focused on the above-described problems, and is intended to provide measures against demagnetization of magnets in a rotary electric machine including a rotor core equipped with the magnets while reducing degradation of performance of the machine.

Solution to the Problem

To solve the above-described problems, in an aspect of the present invention includes:

a plurality of permanent magnets (220);

a first rotor core (240) having a plurality of gaps (241) penetrating the first rotor core (240) along an axial direction; and a second rotor core (250) being in contact with an axial end of the first rotor core (240) and having a plurality of magnet-housing slots (211) associated with the gaps (241), wherein the gaps (241) have a magnetic resistance lower than that of the magnet-housing slots (211).

In this configuration, upon application of an opposing magnetic field to the rotor (200), for example, this magnetic flux travels toward the permanent magnets (220) in the magnet-housing slots (211) to some extent, but a large part of the magnetic flux travels toward the first rotor core (240). This is because the magnetic resistance of the gaps (241) is lower than that of the magnet-housing slots (211). That is, the motor of the present invention can reduce the intensity of the magnetic field applied on the permanent magnets (220), as compared to conventional motors.

In addition, since the first rotor core (240) is in contact with the second rotor core (250), a magnetic field from a stator (100) (which will be described later) is efficiently applied to the first rotor core (240). Thus, the first rotor core (240) is allowed to generate a reluctance torque.

In a second aspect of the present invention, in the rotor of the first aspect, each of the gaps (241) has a radial width (Wg1) smaller than a radial width (Wm1) of an associated one of the magnet-housing slots (211).

In this configuration, the magnetic resistance of the gaps (241) is determined based on the radial width (Wg1) of the gaps (241).

In a third aspect of the present invention, in the rotor of the first or second aspect, the first rotor core (240) has an axial dimension smaller than that of the second rotor core (250).

In this configuration, the magnet torque is dominant over the reluctance torque.

In a fourth aspect of the present invention, in the rotor of any one of the first through third aspects, the second rotor core (250) is sandwiched between the first rotor cores (240) in the axial direction.

In this configuration, an application of an opposing magnetic field on the rotor (200) causes a large part of this magnetic flux toward both axial ends of the rotor (200). In addition, the magnet-housing slots (211) are covered with the first rotor core (240).

In a fifth aspect of the present invention, in the rotor of any one of the first through third aspects, the first rotor core (240) is sandwiched between the second rotor cores (250) in the axial direction.

In this configuration, an application of an opposing magnetic field on the rotor (200) causes a large part of this magnetic flux to travel toward an axial center (a center in the axial direction) of the rotor (200).

A rotary electric machine according to a sixth aspect of the present invention includes;

the rotor (200) of any one of the first through fifth aspects; and a stator (100) including a stator core (110) around which a coil (120) is wound.

In a seventh aspect of the present invention, in the rotary electric machine of the sixth aspect, each of the gaps (241) has a radial width (Wg1) larger than that of an air gap (G) between the rotor (200) and the stator (100).

In this configuration, since the width (Wg1) is larger than that of the air gap (G), a short circuit of a magnetic flux caused by the first rotor core (240) can be prevented.

Advantages of the Invention

In the first aspect, the intensity of the opposing magnetic field applied on the permanent magnets (220) can be reduced, and a reluctance torque can be produced by the first rotor core (240). Thus, a rotary electric machine including a rotor having a rotor core equipped with magnets can be provided with measures against demagnetization while reducing performance degradation of the machine.

In the second aspect, the magnetic resistance can be determined depending on a radial width (Wg1) of the gaps (241), thereby easily setting the magnetic resistance.

In the fourth aspect, a large part of an opposing magnetic field applied on the rotor (200) travels toward both axial ends, and thus, measures against demagnetization can be obtained at both ends of the permanent magnets (220). In addition, since the magnet-housing slots (211) are covered with the first rotor core (240), a cover for preventing detachment of the permanent magnets (220), for example, can be omitted.

In the fifth aspect, since a large part of the opposing magnetic field applied on the rotor (200) travels toward an axial center, measures against demagnetization can be obtained at the axial center of each of the permanent magnets (220). In this configuration, the permanent magnets (220) can be inserted from both axial ends of the rotor (200). Thus, the rotor (200) can be easily fabricated.

In the seventh aspect, a short circuit of the magnetic flux can be prevented, thereby stably operating the rotary electric machine.

DESCRIPTION OF EMBODIMENTS

Embodiments of the present invention will be described hereinafter with reference to the drawings. The following embodiments are merely preferred examples in nature, and are not intended to limit the scope, applications, and use of the invention.

First Embodiment

Figure 1:
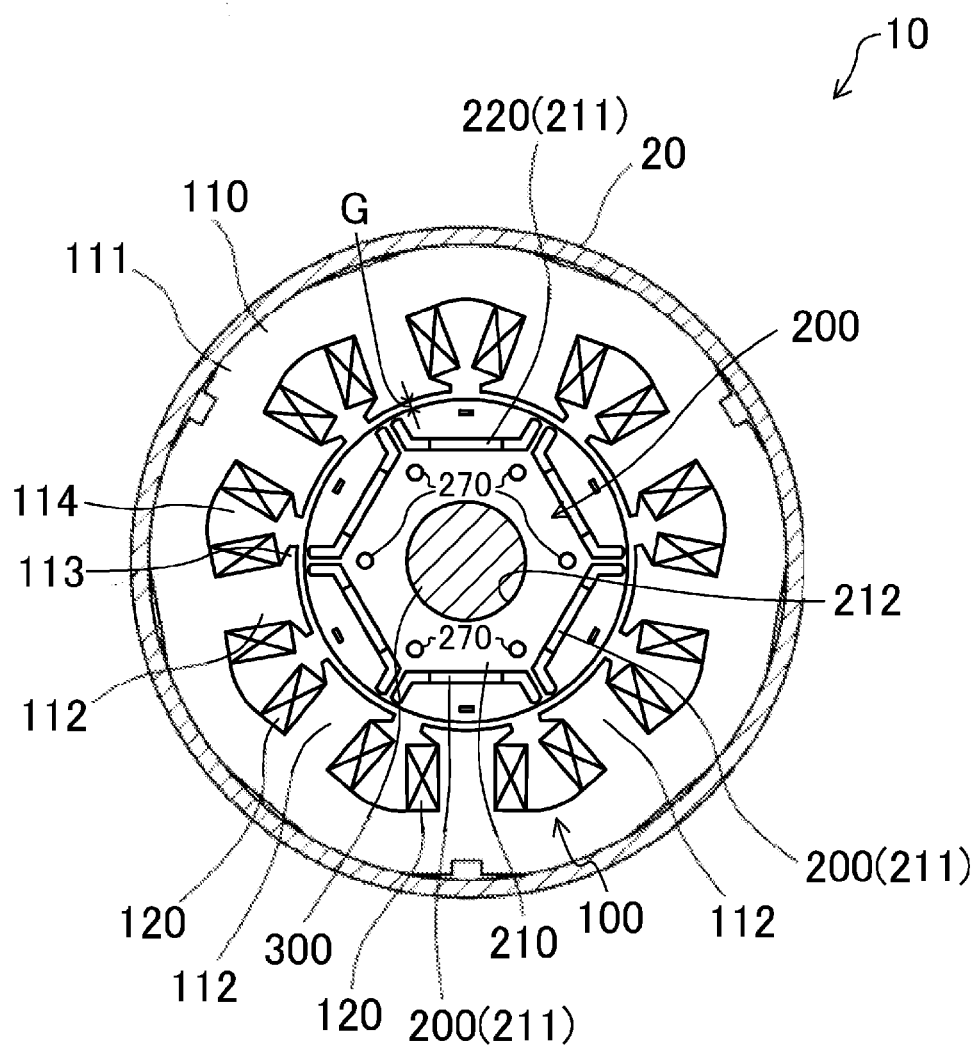
FIG. 1 is a transverse sectional view illustrating a motor according to a first embodiment of the present invention.

FIG. 1 is a transverse sectional view illustrating a motor (10) according to a first embodiment of the present invention. The motor (10) is used for, for example, an electric compressor (not shown) of an air conditioner.

<Configuration of Motor (10)>

As illustrated in FIG. 1, the motor (10) includes a stator (100), a rotor (200), and a driving shaft (300), and is housed in a casing (20) of the electric compressor. In the following description, the "axial direction" or "axial" refers to the direction along the axis of the driving shaft (300), and the "radial direction" or "radial" refers to the direction orthogonal to the axis. The outer peripheral side refers to a distal side relative to the axis, whereas the inner peripheral side is a proximal side relative to the axis.

<Stator (100)>

As illustrated in FIG. 1, the stator (100) a cylindrical stator core (110) and a coil (120).

Figure 2:
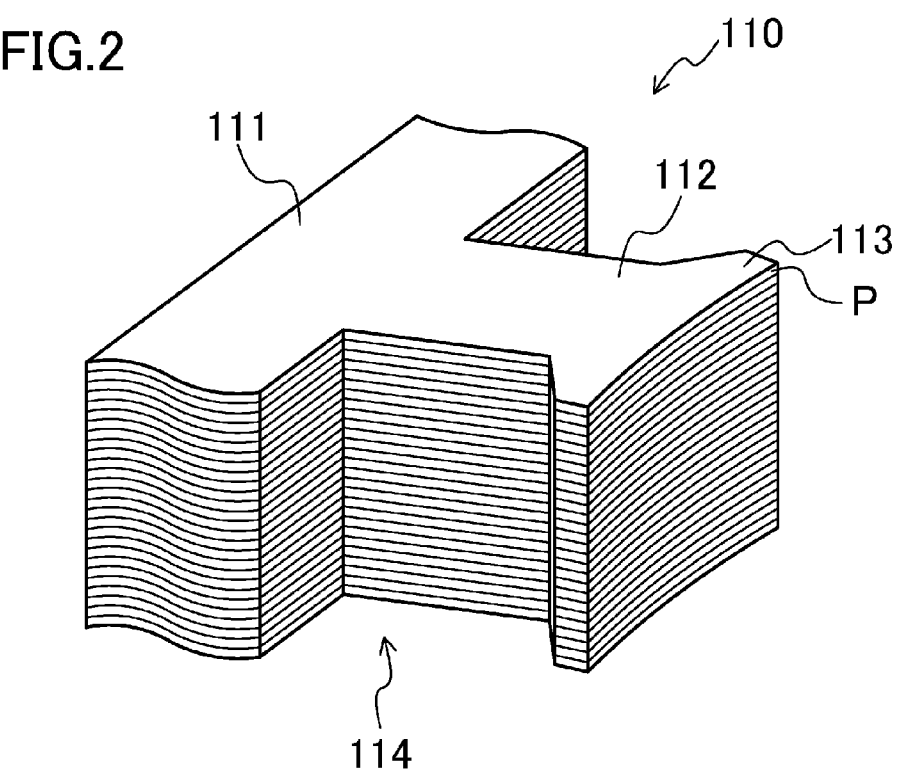
FIG. 2 is a perspective view illustrating a stator of the first embodiment.

The stator core (110) is a multilayer core obtained by forming a plate through punching of a flat rolled magnetic steel sheet (P) with press work and laminating such plates in the axial direction. FIG. 2 is a perspective view illustrating the stator (100) of the first embodiment. As illustrated in FIGS. 1 and 2, the stator core (110) includes a back yoke (111), a plurality of (nine in this embodiment) teeth (112), and brims (113). FIG. 2 mainly illustrates one of the teeth (112).

As illustrated in FIGS. 1 and 2, each of the teeth (112) is a rectangular portion of the stator core (110) extending in the radial direction. Space between each adjacent ones of the teeth (112) forms a slot (114) in which the coil (120) is housed.

The back yoke (111) has a ring shape. The back yoke (111) joins the teeth (112) together at outer peripheral sides of the teeth (112). In the stator core (110), the outer periphery of the back yoke (111) is fixed to the inner surface of the casing (20).

The brims (113) are continuous to the inner peripheries of the teeth (112). Each of the brims (113) is wider than (i.e., has a peripheral length larger than that of) an associated one of the teeth (112). Each of the brims (113) forms a cylindrical surface at the inner peripheral side thereof. This cylindrical surface faces the outer peripheral surface (the cylindrical surface) of a rotor core (210), which will be described later, at a predetermined distance (i.e., with an air gap (G) provided between the cylindrical surface and the outer peripheral surface).

Figure 3:
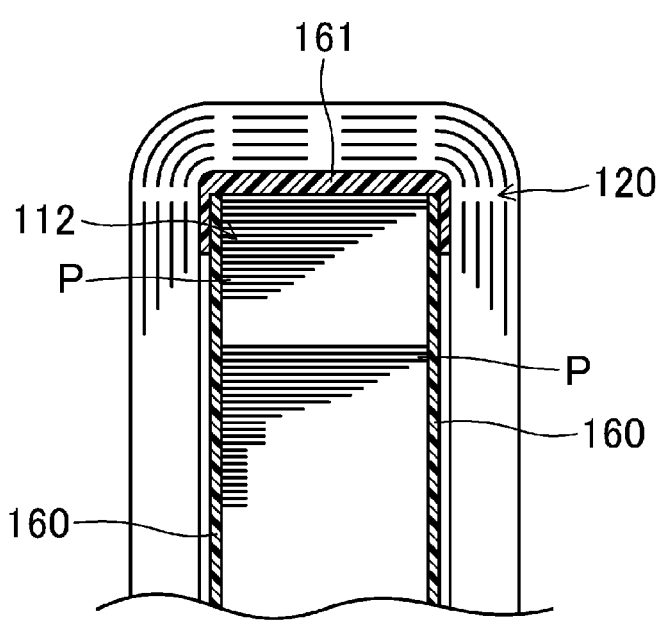
FIG. 3 is a sectional view illustrating teeth when a stator core of the first embodiment is viewed from an inner peripheral side.

A coil (120) is wound around each of the teeth (112) by a so-called concentrated winding technique. Specifically, the coil (120) is wound around each of the teeth (112), and the coil (120) wound is housed in associated ones of the slots (114). FIG. 3 is a sectional view illustrating one of the teeth (112) when the stator core (110) of this embodiment is viewed from the inner peripheral side. As illustrated in FIG. 3, insulators (161) are disposed at both axial sides of the tooth (112), and insulator films (160) are sandwiched between the coil (120) and the tooth (112). In this embodiment, the insulator films (160) are polyethylene terephthalate films.

<Rotor (200)>

Figure 4:
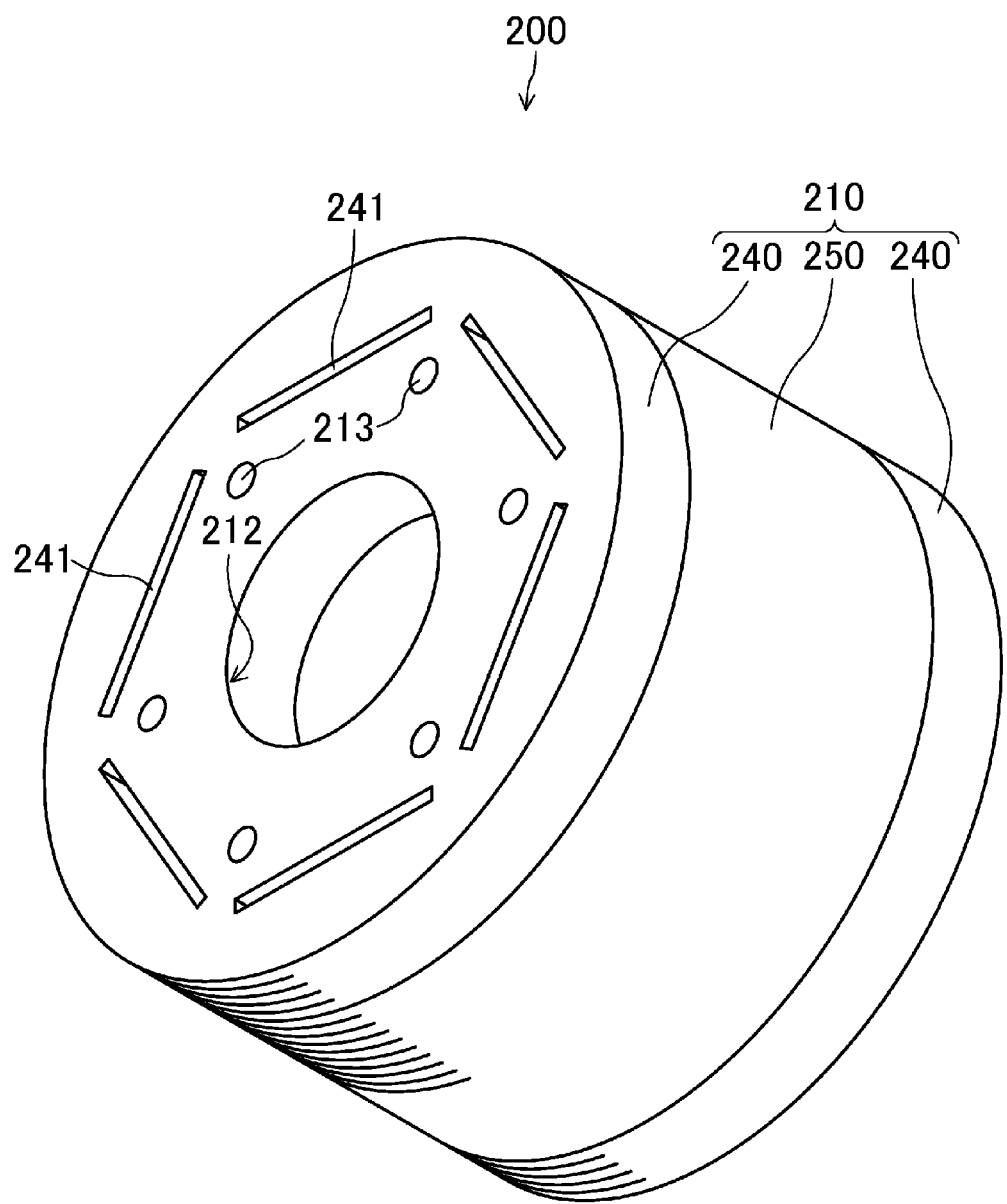
FIG. 4 is a perspective view illustrating a rotor of the first embodiment.
Figure 5:
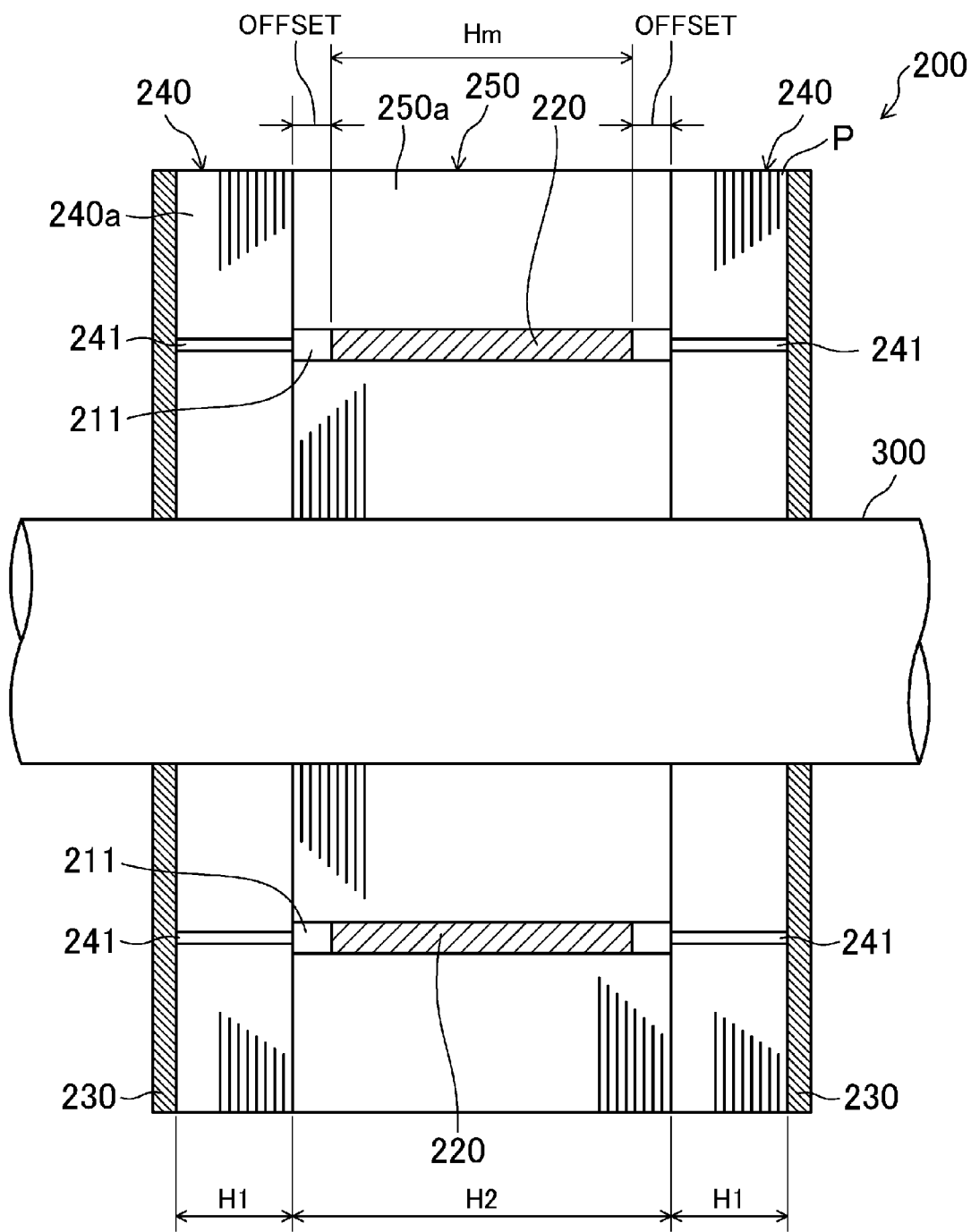
FIG. 5 is a sectional view illustrating the rotor of the first embodiment.

FIG. 4 is a perspective view illustrating the rotor (200) of the first embodiment. FIG. 5 is a sectional view illustrating the rotor (200) of the first embodiment. The rotor (200) includes a rotor core (210) (a magnetic core), a plurality of permanent magnets (220), and two end plates (230), and has a cylindrical shape. In this embodiment, the rotor (200) includes six permanent magnets (220). FIG. 4 does not show the end plates (230).

The rotor core (210) is a multilayer core obtained by forming a plate through punching of a flat rolled magnetic steel sheet (P) with press work and laminating such plates in the axial direction. As will be described in detail below, the rotor core (210) is divided, along the axial direction, into an odd number of (three in this embodiment) rotor cores that are in contact with one another. More specifically, the rotor core (210) is divided into three parts: two first rotor cores (240) each located at an odd numbered position from an end in the axial direction (i.e., an axial end) of the rotor core (210); and a second rotor core (250) located at an even-numbered position (see FIG. 5). As illustrated in FIG. 5, in this embodiment, the height (H1) (i.e., an axial dimension) of each of the first rotor cores (240) is smaller than the height (H2) of the second rotor core (250).

Now, configurations of, for example, the first and second rotor cores (240 and 250) will be described. In the following description, the first rotor cores (240) and the second rotor core (250) will be also referred to as divided rotor cores (240 and 250).

<Second Rotor Core (250)>

As illustrated in, for example, FIG. 4, the second rotor core (250) has magnet-housing slots (211) individually housing the permanent magnets (220). The magnet-housing slots (211) are disposed at a pitch of 60° about the axis of the second rotor core (250). Each of the magnet-housing slots (211) has an approximately U shape when viewed in the axial direction, and penetrates the second rotor core (250) in the axial direction. More specifically, as illustrated in FIG. 4, each of the magnet-housing slots (211) includes a magnet receiver (211a) orthogonal to the radius of the rotor core (210), and two barriers (211b) extending from the magnet receiver (211a) toward the outer peripheral side. The magnet receiver (211a) is rectangular when viewed in FIG. 1, and receives an associated one of the permanent magnets (220). The axial height (the height in the axial direction) (Hm) of the permanent magnets (220) is smaller than the axial height (H2) of the second rotor core (250) (see FIG. 5).

<First Rotor Core (240)>

Figure 6:
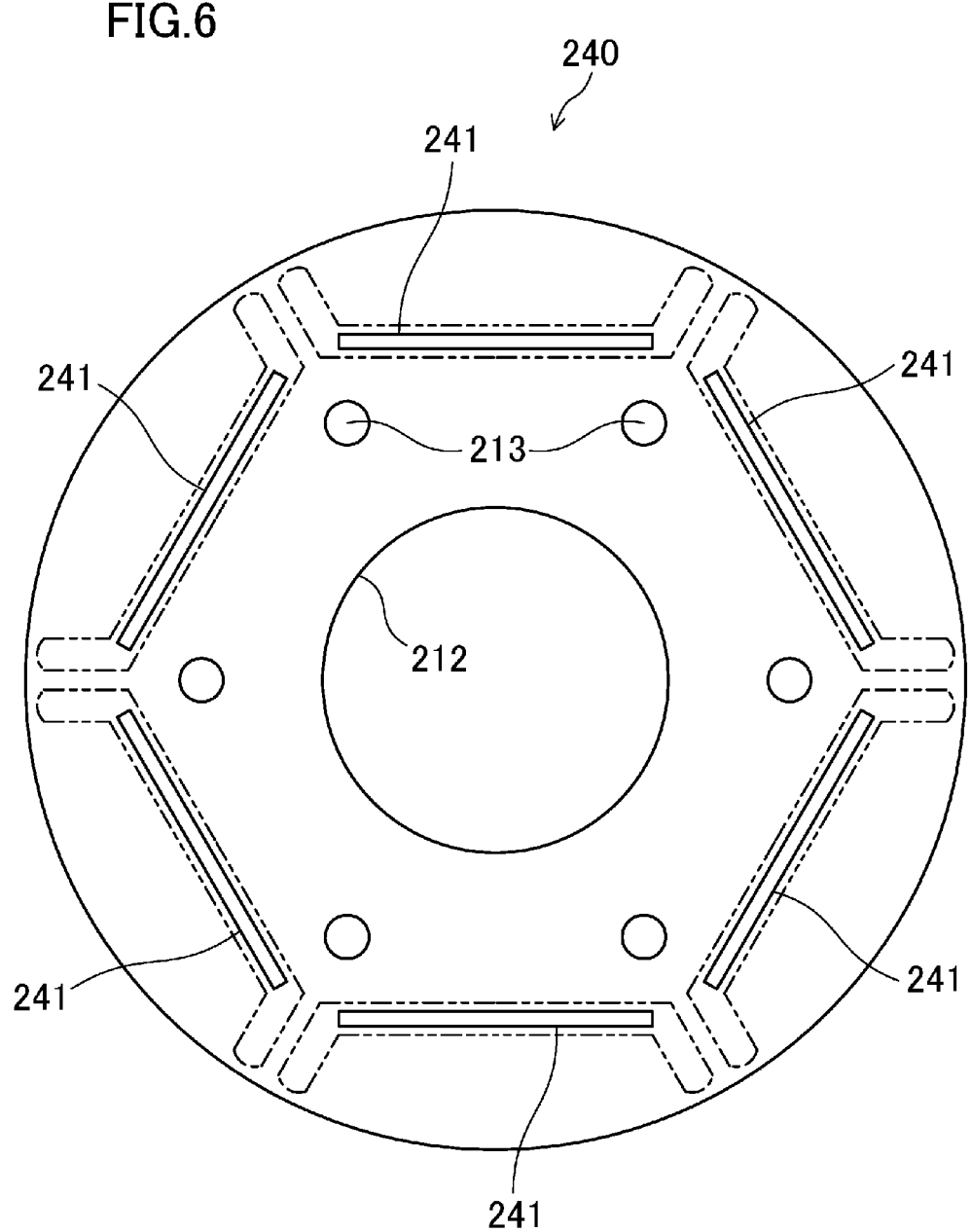
FIG. 6 is a top view illustrating a first rotor core when viewed in the axial direction.

FIG. 6 is a top view illustrating one of the first rotor cores (240) when viewed in the axial direction. As illustrated in FIG. 6, the first rotor core (240) has six gaps (241) penetrating the first rotor core (240) in the axial direction. These gaps (241) face the magnet-housing slots (211) when the first rotor core (240) is placed on the second rotor core (250). In FIG. 6, the magnet-housing slots (211) individually associated with the gaps (241) are indicated by chain lines.

Figure 7:
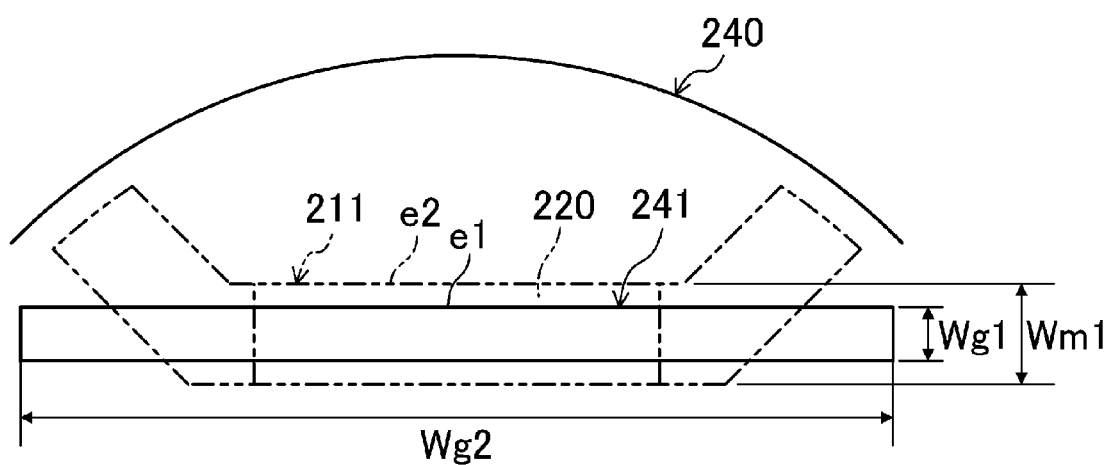
FIG. 7 is an illustration showing a relationship in position and size between a magnet-housing slot and a gap.

FIG. 7 is an illustration showing a relationship in position and size between the magnet-housing slot (211) and the gap (241). In FIG. 7, the continuous lines represent the shape of the gap (241), and the chain lines represent the shape of the magnet-housing slot (211). In this embodiment, the gap (241) is rectangular in FIG. 7. The width (Wg2) of the gap (241) in the direction orthogonal to the radius extends to portions near the outer periphery of the first rotor core (240). This configuration can reduce a leakage magnetic flux occurring between adjacent magnetic poles.

The gaps (241) have a magnetic resistance lower than that of the magnet-housing slots (211). In this embodiment, the radial width (Wg1) (i.e., a width along the radial direction) of the gap (241) is smaller than the radial width (Wm1) of the magnet receiver (211a). In this manner, in the radial direction, the magnetic resistance of the gap (241) is smaller than that of the magnet-housing slot (211). The gap (241) is positioned in such a manner that when viewed in the radial direction, a longer side (e1) at the outer peripheral side of the gap (241) is closer to the inner peripheral side than a longer side (e2) of the magnet receiver (211a) is. The radial width (Wg1) of the gap (241) is greater than or equal to the size of the air gap (G). This is because if the width (Wg1) were smaller than that of the air gap (G), a short circuit of a magnetic flux would be caused by the first rotor core (240).

<End Plate (230)>

Each of the end plates (230) has a disk-shape, and is made of a non-magnetic metal such as stainless. Each of the end plates (230) and the first and second rotor cores (240 and 250) has six bolt holes (213). The bolt holes (213) penetrate the end plates (230) or the first or second rotor core (240 or 250) in the axial direction. When the end plates (230) and the first and second rotor cores (240 and 250) are placed on one another, the bolt holes (213) of one of the end plates (230) or the first or second rotor core (240 or 250) overlap with those of another of the end plates (230) or the first or second rotor core (240 or 250).

<Assembly of Rotor (200)>

Figure 8:
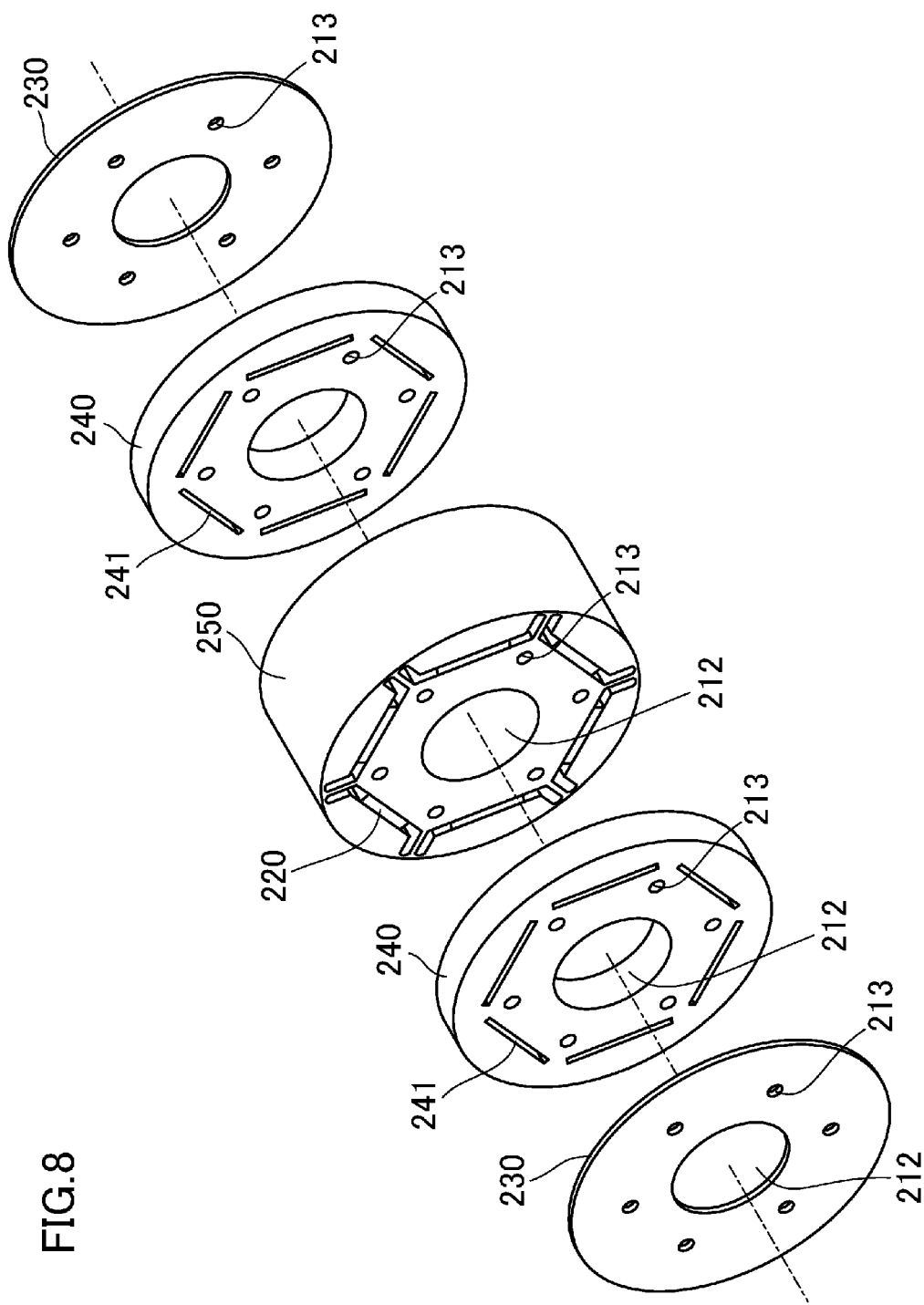
FIG. 8 is a perspective view illustrating an assembly of the rotor of the first embodiment.

FIG. 8 is a perspective view illustrating an assembly of the rotor (200) of this embodiment. In the second rotor core (250), the permanent magnets (220) are placed in the magnet receivers (211a). In this case, as illustrated in FIG. 5, each of the permanent magnets (220) is previously displaced, i.e., offset, inward from each axial end of the second rotor core (250). The permanent magnets (220) are fixed in advance to the second rotor core (250) by means of, for example, an adhesive, so as not to move in the magnet receivers (211a).

In the rotor (200), the first and second rotor cores (240 and 250) are arranged such that each of the first rotor cores (240) is located at an odd numbered position from an end and the second rotor core (250) is located at an even-numbered position from the end. In this embodiment, as illustrated in FIG. 8, the second rotor core (250) is sandwiched between the first rotor cores (240) in the axial direction. In this manner, the first rotor cores (240) are located at the first and third positions and the second rotor core (250) is located at the second position from an end of the rotor (200). In this case, the positions of the first rotor cores (240) and the second rotor core (250) are adjusted in relation to each other such that the magnet-housing slots (211) overlap with the gaps (241) of the first rotor cores (240) (see FIGS. 6 and 7). When the first rotor cores (240) are placed on the second rotor core (250), the first rotor cores (240) are in contact with the second rotor core (250), but as described above, the axial ends of the permanent magnets (220) are displaced inward from the axial ends of the second rotor core (250), and thus, the permanent magnets (220) are not in contact with the first rotor cores (240).

As illustrated in FIG. 8, the end plates (230) are attached to the ends of the first rotor cores (240). Each of the end plates (230) is fixed to the rotor core (210) with six bolts (270) (see FIG. 1) penetrating the bolt holes (213).

A shaft hole (212) is formed at the center of each of the first and second rotor cores (240 and 250). A driving shaft (300) of a metal such as iron is fitted in this shaft hole (212) by burning. The driving shaft (300) is used for driving a compression mechanism (not shown) in the electric compressor.

<<Flux Path Upon Application of Opposing Magnetic Field>>

Figure 9:
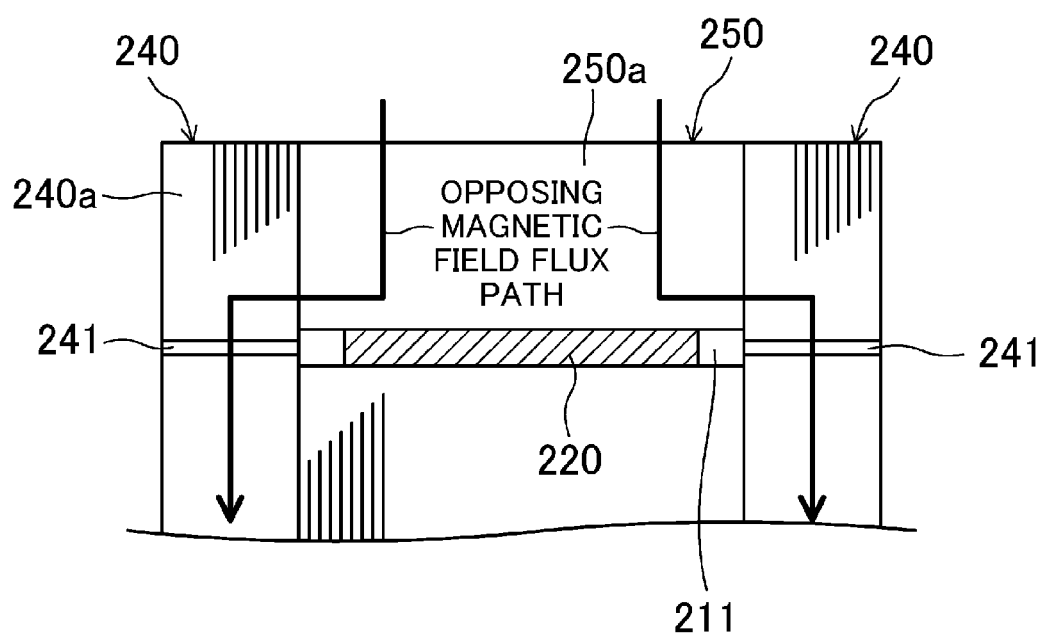
FIG. 9 is an illustration of a flux path (an opposing magnetic field flux path) upon application of an opposing magnetic field.

FIG. 9 is an illustration of a flux path (an opposing magnetic field flux path) upon application of an opposing magnetic field. For example, suppose that an opposing magnetic field is applied to the rotor (200) of this embodiment and a magnetic flux is applied from the stator (100) onto magnetic core portions (240a and 250a) (see FIG. 5) at the outer peripheral sides of the permanent magnets (220). This magnetic flux travels toward the magnetic core portion (250a) near the permanent magnets (220) to some degree, but as indicated by the arrows in FIG. 9, a large part of the magnetic flux travels toward the magnetic core portion (240a) of an associated one of the first rotor cores (240). This is because the magnetic resistance of the gaps (241) of the first rotor cores (240) is lower than that of the magnet-housing slots (211). That is, the motor (10) of this embodiment exhibits a low strength of the opposing magnetic field applied on the permanent magnets (220), as compared to conventional motors. Thus, in this embodiment, it is possible to provide measures against demagnetization of the permanent magnets (220) caused by an opposing magnetic field.

In this embodiment, if the size of the motor (10) is to be made equal to that of a conventional motor, the axial length (i.e., the length along the axial direction) (Hm) of the permanent magnets (220) decreases by an amount corresponding to the first rotor cores (240), and thus, a decrease in magnet torque is expected. However, since the first rotor cores (240) are in contact with the second rotor core (250), a magnetic field from the stator (100) is efficiently applied on the first rotor cores (240). Accordingly, the motor (10) can generate a reluctance torque by using the first rotor cores (240). That is, in this embodiment, a reluctance torque in the first rotor cores (240) can compensate for a decrease in magnet torque.

Advantages of this Embodiment

In the manner described above, in this embodiment, a motor including a rotor equipped with magnets can be provided with measures against demagnetization while reducing performance degradation of the motor.

In addition, the magnet-housing slots (211) are covered with the first rotor cores (240). Thus, a cover for preventing detachment of the permanent magnets (220), for example, is not necessary.

Second Embodiment

Figure 10:
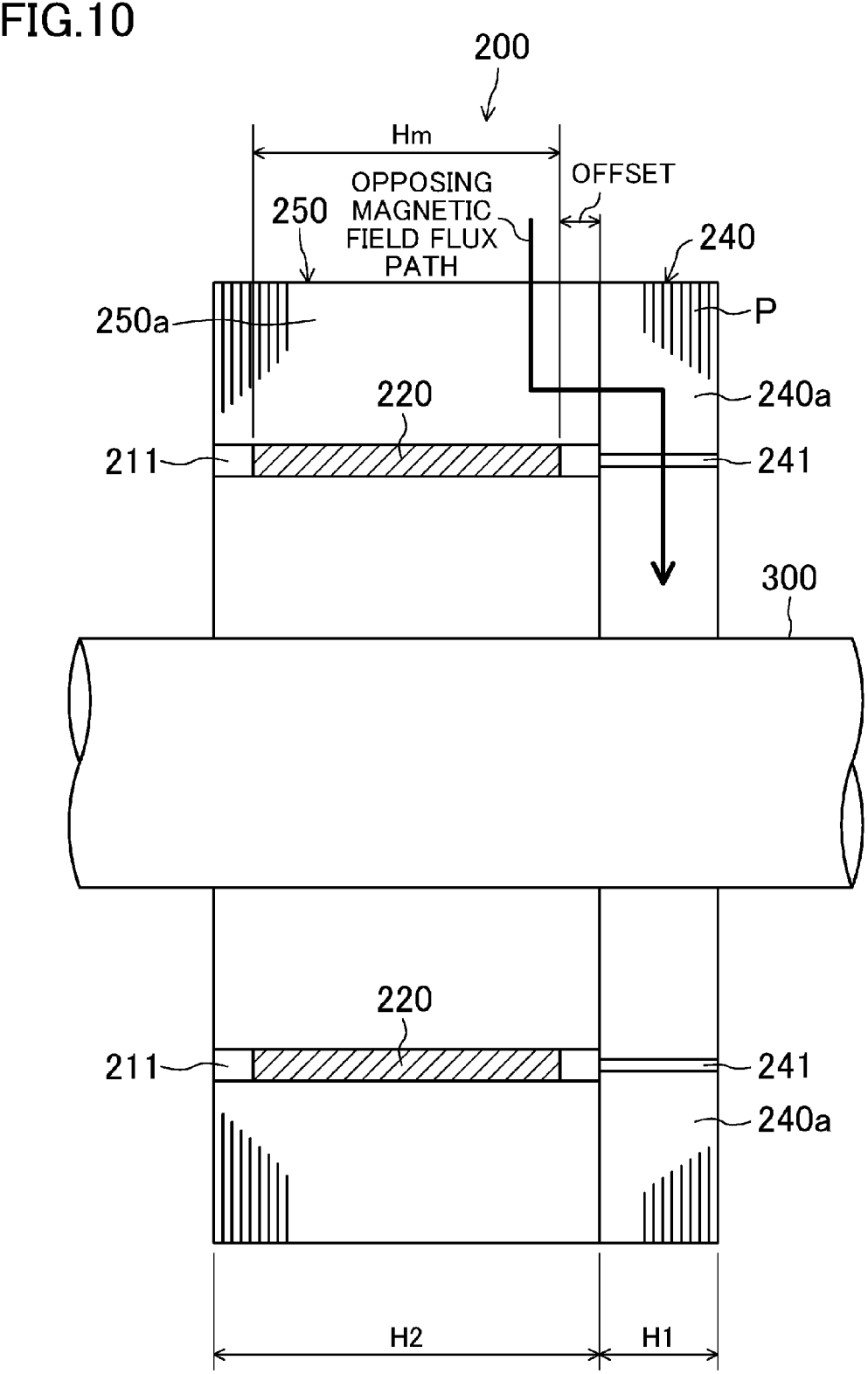
FIG. 10 is a sectional view illustrating a rotor according to a second embodiment of the present invention.

FIG. 10 is a sectional view illustrating a rotor (200) according to a second embodiment of the present invention. The rotor (200) of this embodiment includes a first rotor core (240) and a second rotor core (250). In this embodiment, the height (H1) (i.e., an axial dimension) of the first rotor core (240) is also smaller than the height (H2) of the second rotor core (250). The first rotor core (240) is in contact with the second rotor core (250) at their axial ends.

In this configuration of this embodiment, even upon an application of an opposing magnetic field on the rotor (200), a large part of the magnetic flux travels toward a magnetic core portion (240a) near the first rotor core (240). Thus, in this embodiment, measures against demagnetization can be provided in permanent magnets (220) near the first rotor core (240). In the second rotor core (250), the permanent magnets (220) can be easily inserted in magnet-housing slots (211) from an axial end of the second rotor core (250) that is not in contact with the first rotor core (240). In addition, a cover for preventing detachment of the permanent magnets (220), for example, is not necessary at the axial end of the second rotor core (250) that is not in contact with the first rotor core (240).

Third Embodiment

Figure 11:
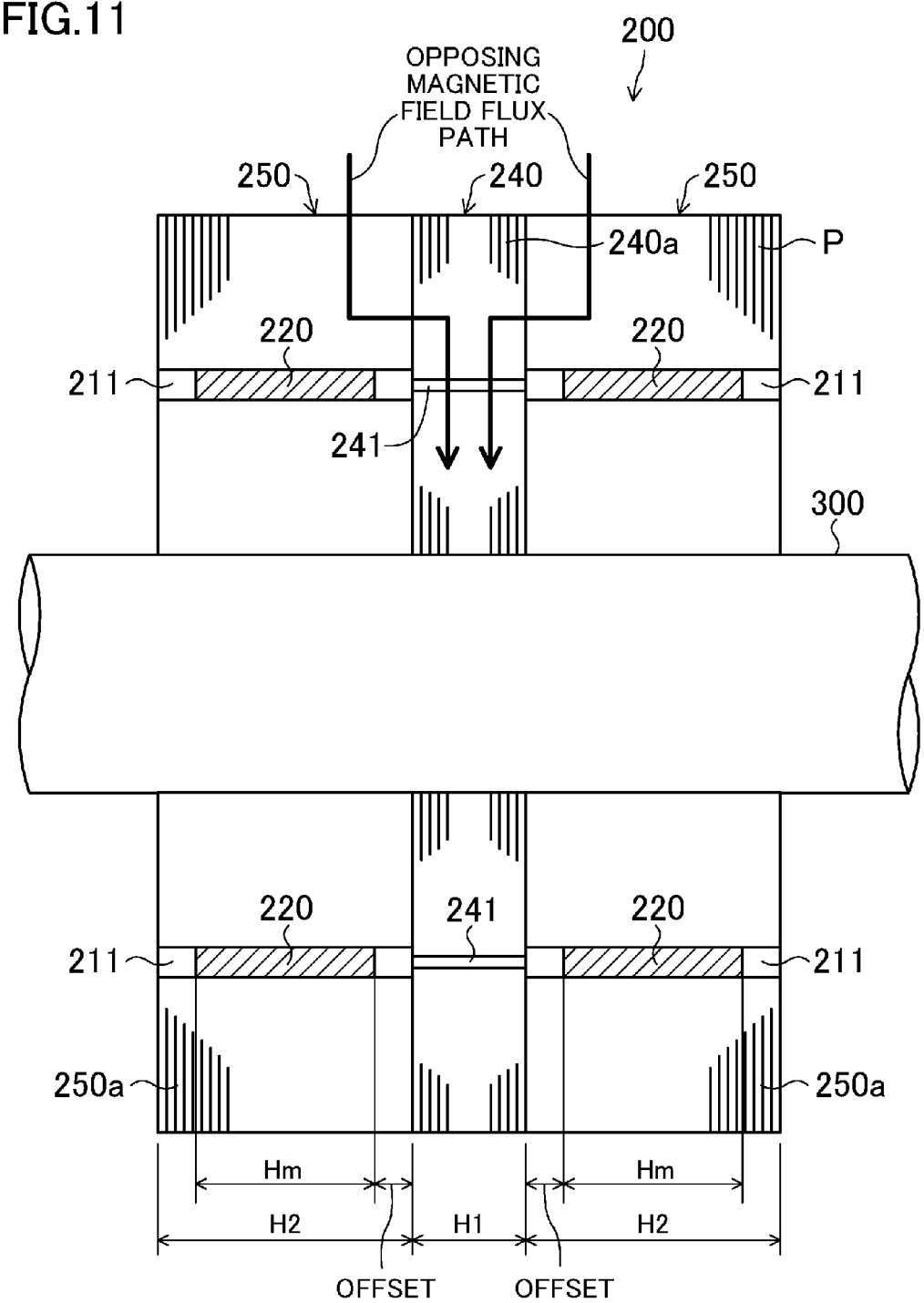
FIG. 11 is a sectional view illustrating a rotor according to a third embodiment of the present invention.

FIG. 11 is a sectional view illustrating a rotor (200) according to a third embodiment of the present invention. The rotor (200) of this embodiment includes a first rotor core (240) and two second rotor cores (250). The first rotor core (240) is sandwiched between the second rotor cores (250) in the axial direction. In this embodiment, the height (H1) (i.e., an axial dimension) of the first rotor core (240) is also smaller than the height (H2) of the second rotor cores (250).

In this configuration of the third embodiment, even upon an application of an opposing magnetic field on the rotor (200), a large part of the magnetic flux travels toward a magnetic core portion (240a) near the first rotor core (240). Thus, measures against demagnetization of permanent magnets (220) can be provided near the axial center of rotor (200) on which a relatively strong opposing magnetic field is likely to be applied.

In addition, the permanent magnets (220) can be inserted from both axial ends of the rotor (200). Thus, the rotor (200) can be easily fabricated.

Fourth Embodiment

Figure 12:
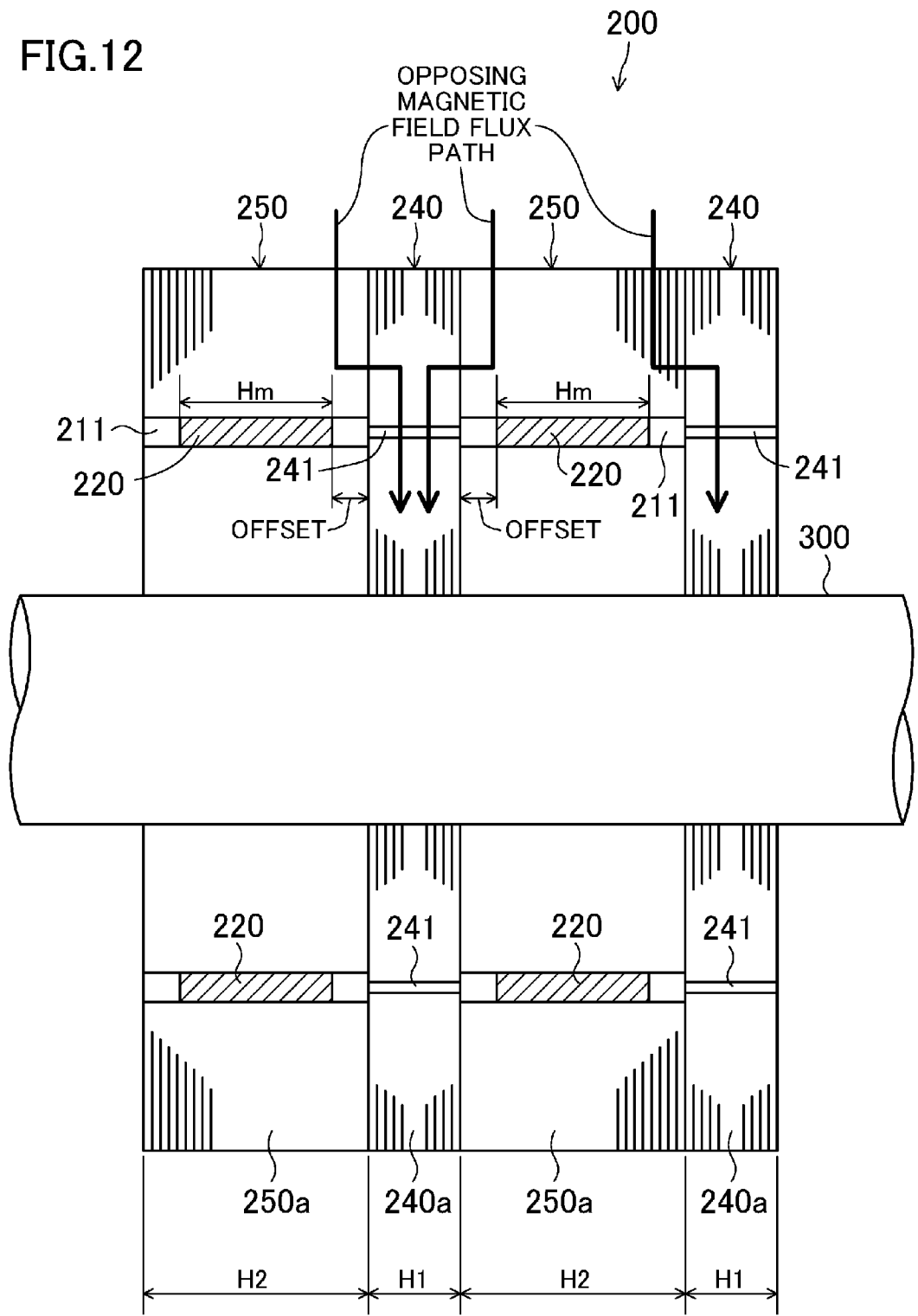
FIG. 12 is a sectional view illustrating a rotor according to a fourth embodiment of the present invention.

FIG. 12 is a sectional view illustrating a rotor (200) according to a fourth embodiment of the present invention. In this embodiment, the rotor (200) includes two first rotor cores (240) and two second rotor cores (250). These first and second rotor cores (240 and 250) are alternately stacked. In this embodiment, the height (H1) (i.e., an axial dimension) of the first rotor cores (240) is also smaller than the height (H2) of the second rotor cores (250). In this configuration, upon an application of an opposing magnetic field on the rotor (200), a large part of the magnetic flux travels toward magnetic core portions (240a) near the first rotor cores (240). Thus, in this embodiment, it is also possible to provide measures against demagnetization while reducing performance degradation of the motor.

Fifth Embodiment

Figure 13:
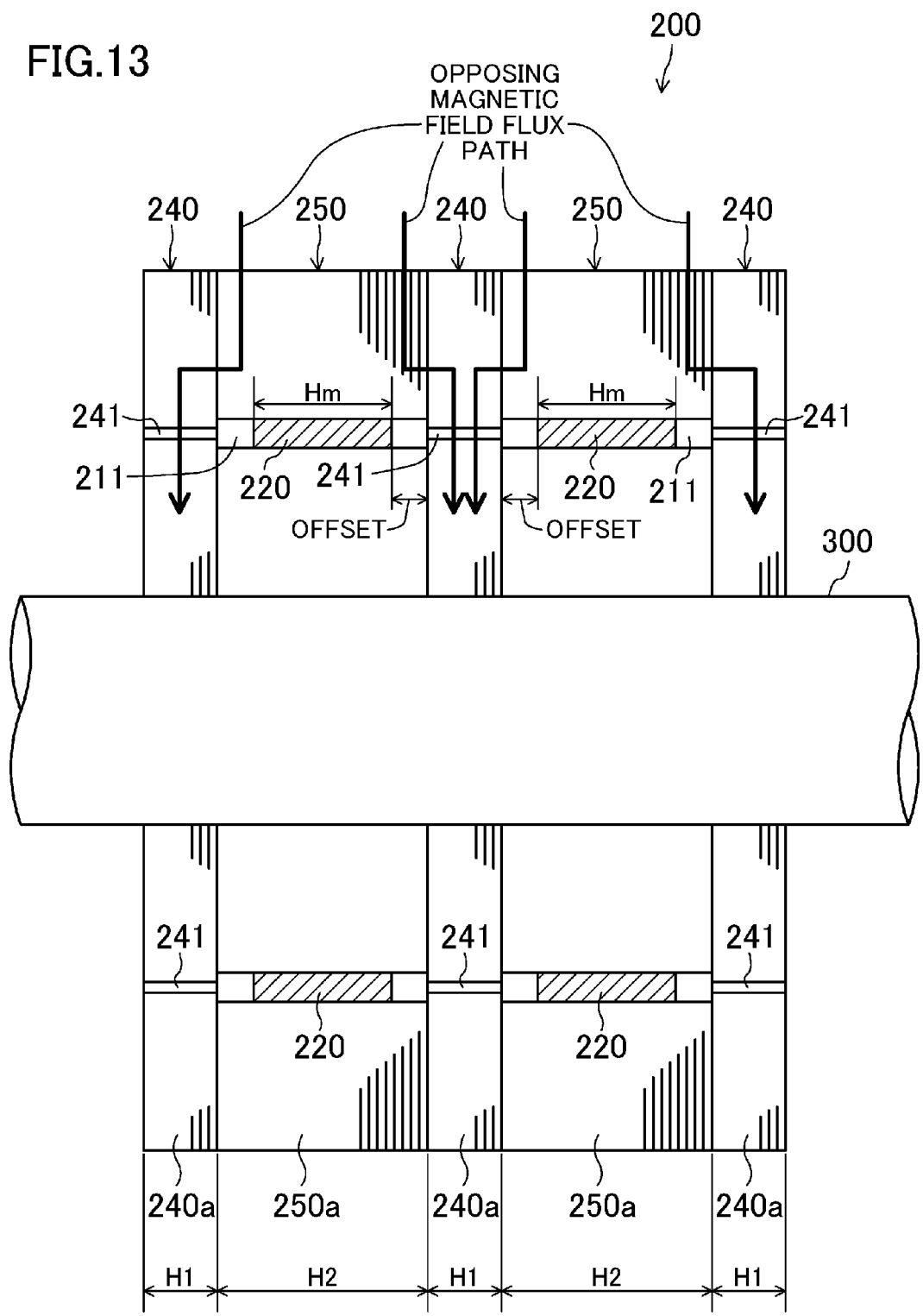
FIG. 13 is a sectional view illustrating a rotor according to a fifth embodiment of the present invention.

FIG. 13 is a sectional view illustrating a rotor (200) according to a fifth embodiment of the present invention. In this embodiment, the rotor (200) includes three first rotor cores (240) and two second rotor cores (250). The first rotor cores (240) and the second rotor cores (250) are alternately stacked. In this embodiment, the height (H1) (i.e., an axial dimension) of the first rotor cores (240) is also smaller than the height (H2) of the second rotor cores (250). In this configuration, upon an application of an opposing magnetic field on the rotor (200), a large part of the magnetic flux travels toward magnetic core portions (240a) near the first rotor cores (240). Thus, in this embodiment, it is also possible to provide measures against demagnetization while reducing performance degradation of the motor.

Sixth Embodiment

Figure 14:
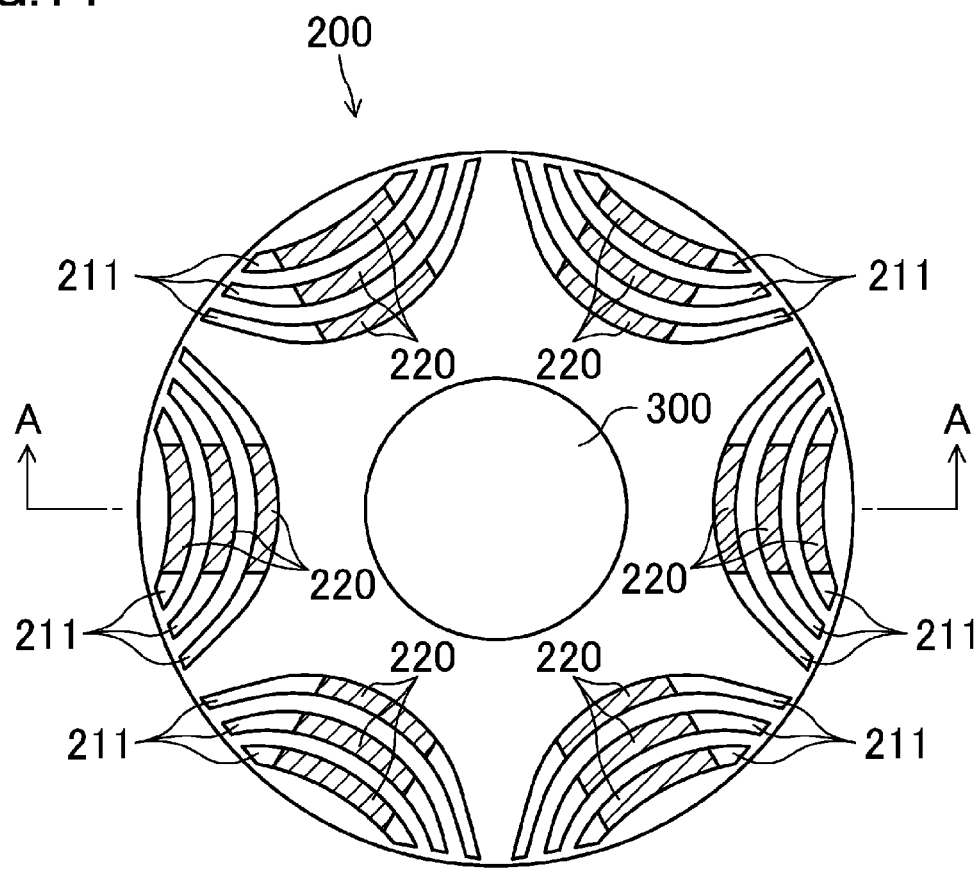
FIG. 14 is a top view illustrating a rotor according to a sixth embodiment of the present invention.
Figure 15:
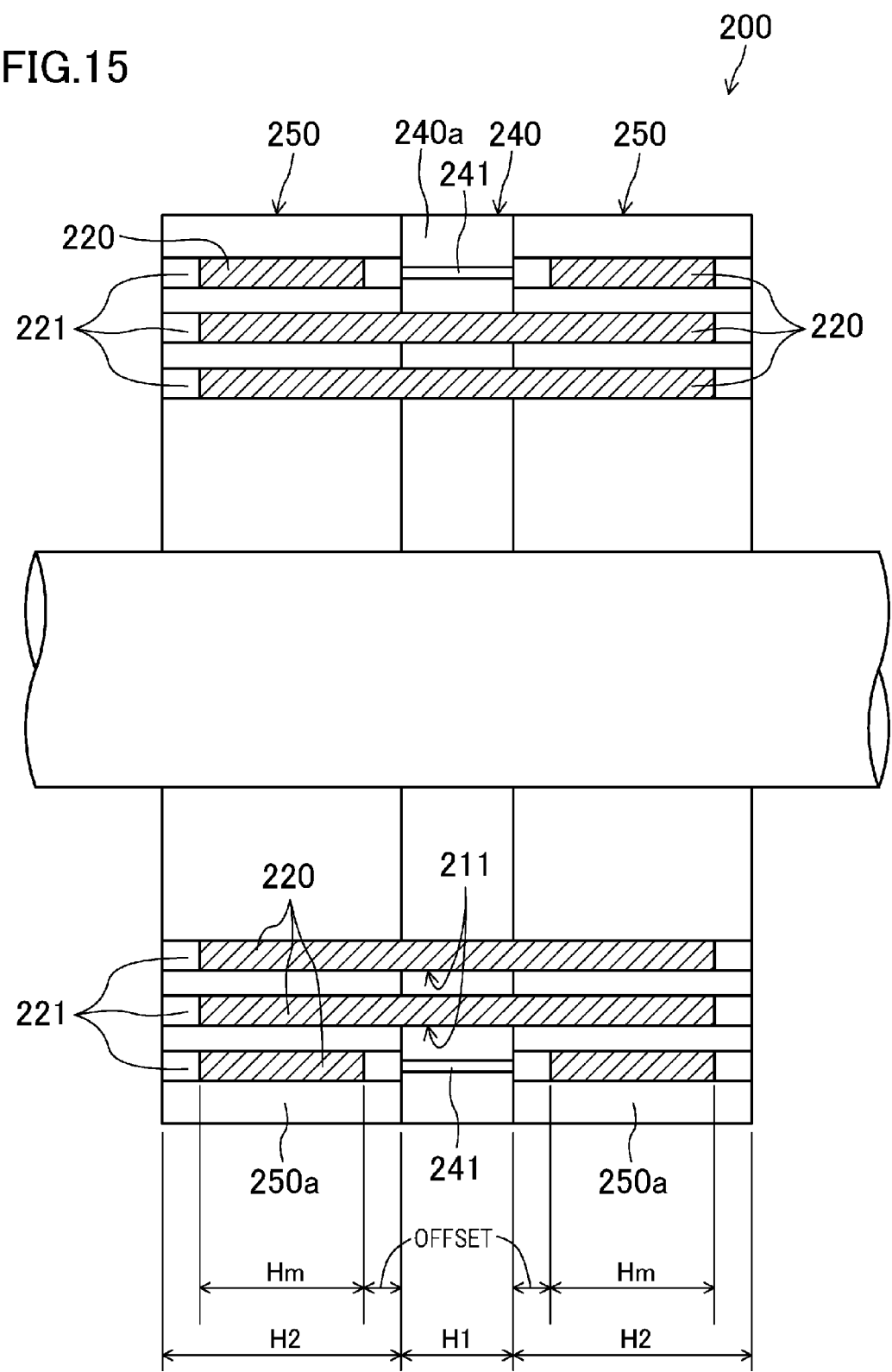
FIG. 15 is a sectional view illustrating the rotor of the sixth embodiment.

FIG. 14 is a top view illustrating a rotor (200) according to a sixth embodiment of the present invention. FIG. 15 is a sectional view illustrating the rotor (200) of the sixth embodiment. FIG. 15 corresponds to an A-A section of FIG. 14. As illustrated in FIG. 15, the rotor (200) of this embodiment includes a first rotor core (240) and two second rotor cores (250). The first rotor core (240) is sandwiched between the second rotor cores (250) in the axial direction. In this embodiment, the height (H1) (i.e., an axial dimension) of the first rotor core (240) is also smaller than the height (H2) of the second rotor core (250).

In the rotor (200) of this embodiment, permanent magnets (220) form multiple layers at each pole. Specifically, three layers of the permanent magnets (220) are provided at each pole. The outermost permanent magnet (220) of the rotor (200) is provided only in the second rotor cores (250). The second-layer and third-layer permanent magnets (220) from the outer peripheral side of the rotor (200) penetrate the first and second rotor cores (240 and 250).

To obtain the multilayer configuration of the permanent magnets (220), multiple layers of magnet-housing slots (211) are provided in the second rotor cores (250). In the first rotor core (240), gaps (241) are provided only at the position corresponding to the outermost permanent magnets (220). Instead of the gaps (241), the first rotor core (240) has magnet-housing slots (211) connected to magnet-housing slots (211) of the second rotor cores (250) at positions corresponding to the second-layer and third-layer permanent magnets (220) from the outermost peripheral side.

As described above, the gaps (241) are provided at the outermost peripheral side of the rotor (200) on which a strong opposing magnetic field can be applied, thereby providing measures against demagnetization of the permanent magnets (220) corresponding to the gaps (241).

In a case where multiple layers of the permanent magnets (220) are provided at each pole as in this embodiment, the first and second rotor cores (240 and 250) may be arranged in the manner described in the first, second, fourth, or fifth embodiment.

An inner layer (e.g., the second layer) located inside the first layer may have gaps (241) similarly to those in the first layer, depending on the strength of the opposing magnetic field.

<<Variations of Gap (241)>>

The shape of the gaps (241) is not limited to the above-described example. For example, each of the embodiments may employ gaps (241) as follows.

Figure 16:
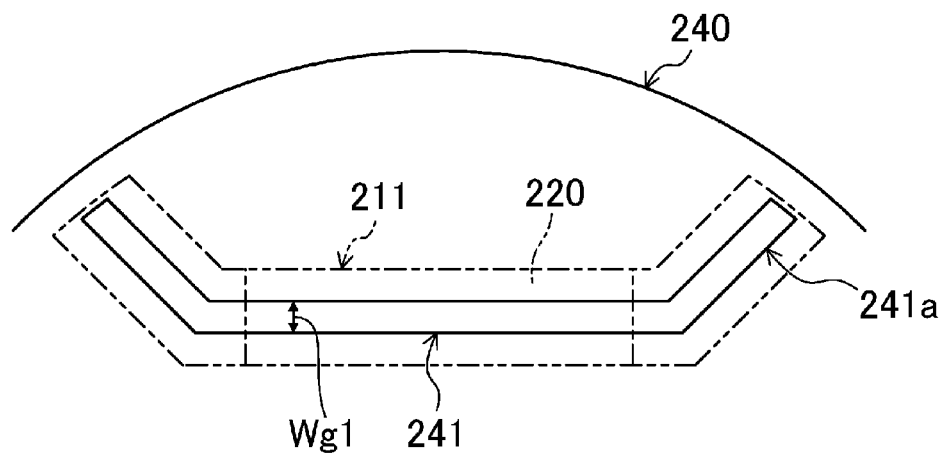
FIG. 16 is a top view illustrating a first variation of the gap.

<1> FIG. 16 is a top view illustrating a first variation of the gap (241). The gap (241) illustrated in FIG. 16 is a through hole whose cross-sectional shape (i.e., the shape projected in the axial direction) extends along the magnet-housing slot (211) and whose width is smaller than that of the magnet-housing slot (211). In this variation, ends (241a) of the gap (241) extend to positions near the outer periphery of the first rotor core (240).

Figure 17:
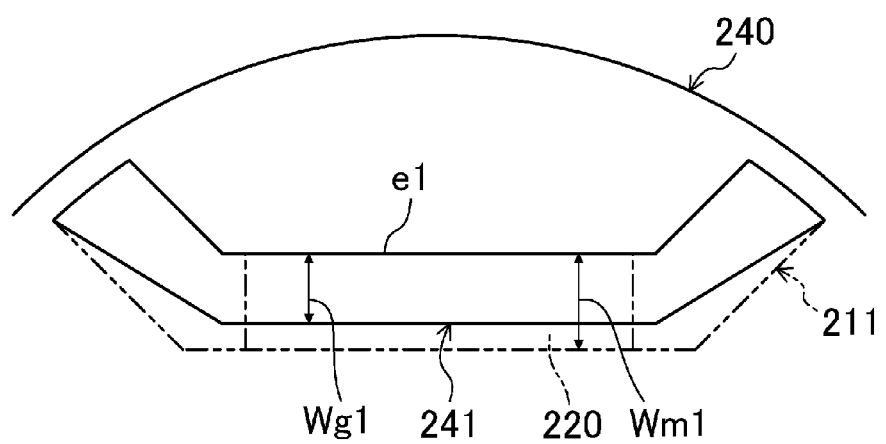
FIG. 17 is a top view illustrating a second variation of the gap.

<2> FIG. 17 is a top view illustrating a second variation of the gap (241). In the variation illustrated in FIG. 17, regarding the shape of the gap (241) projected in the axial direction, the radial width (Wg1) of the gap (241) is smaller than the radial width (Wm1) of the magnet receiver (211a) in a portion of the gap (241) overlapping with the magnet receiver (211a), and the gap (241) substantially extends along the barrier (211b) at a tip of the barrier (211b). In this variation, the longer side (e1) of the gap (241) at the outer peripheral side coincides with the longer side (e2) of the magnet receiver (211a). Alternatively, the positional relationship between the gap (241) and the magnet-housing slot (211) may be determined in relation to each other such that the longer sides at the inner peripheral sides thereof coincide with each other.

Figure 18:
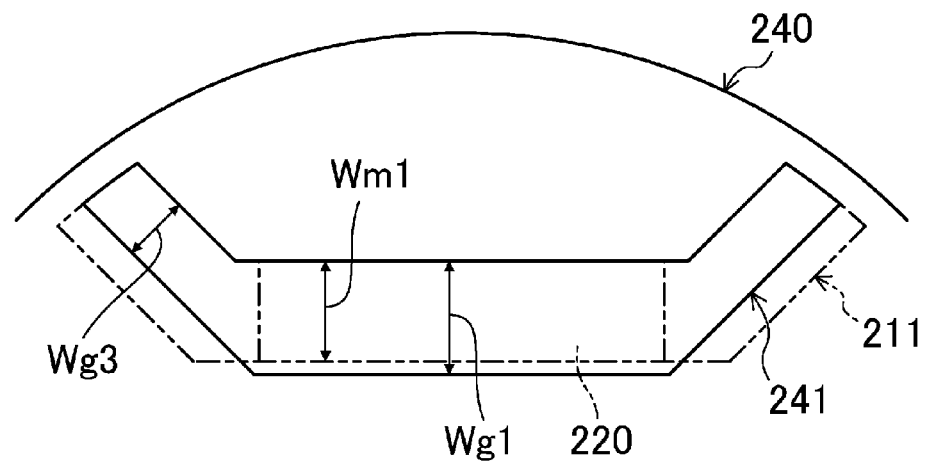
FIG. 18 is a top view illustrating a third variation of the gap.

<3> FIG. 18 is a top view illustrating a third variation of the gap (241). In the variation illustrated in FIG. 18, regarding the shape of the gap (241) projected in the axial direction, a width (Wg3) of the gap (241) is smaller than the width of the barrier (211b) in a portion of the gap (241) overlapping with the barrier (211b), and is equal to, or larger than, the width (Wm1) of the magnet receiver (211a) in a portion of the gap (241) overlapping with the magnet receiver (211a). FIG. 18 illustrates an example in which the width (Wg1) is larger than the width (Wm1).

Figure 19:
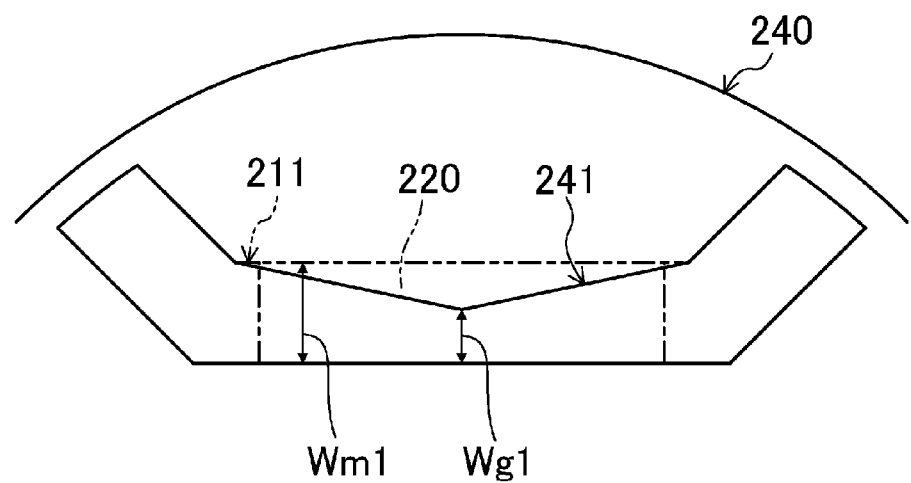
FIG. 19 is a top view illustrating a fourth variation of the gap.

<4> FIG. 19 is a top view illustrating a fourth variation of the gap (241). In the variation of FIG. 19, regarding the shape of the gap (241) projected in the axial direction, a portion of the gap (241) near the center thereof is recessed toward the inner peripheral side in a portion of the gap (241) overlapping with the magnet receiver (211a). Thus, the radial width (Wg1) of the gap (241) is smaller than the radial width (Wm1) of the magnet-housing slot (211). The gap (241) substantially overlaps with the barrier (211b) in a portion of the gap (241) overlapping with the barrier (211b).

Figure 20:
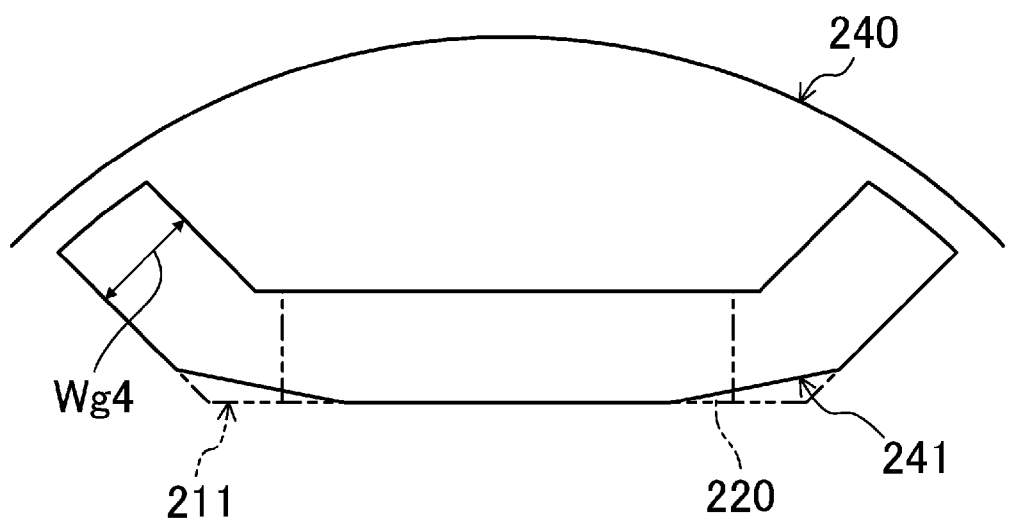
FIG. 20 is a top view illustrating a fifth variation of the gap.

<5> FIG. 20 is a top view illustrating a fifth variation of the gap (241). In the variation illustrated in FIG. 20, regarding the shape of the gap (241) projected in the axial direction, the inner peripheral side line near both ends of the magnet receiver (211a) is moved toward the outer peripheral side. Thus, the width (Wg4) of the gap (241) near an end of the magnet receiver (211a) is smaller than the width near the center of the magnet-housing slot (211). In the example of FIG. 20, the inner peripheral side line of the gap (241) is moved toward the outer peripheral side. Alternatively, the outer peripheral side line may be moved toward the inner peripheral side or moved from both of the inner and outer peripheral sides.

In either example, an end (e.g., the end (241a)), in the direction perpendicular to the radial direction, of the gap (241) preferably extends to a portion near the outer periphery of the first rotor core (240) as closely as possible. This is because this configuration is advantageous for reducing a leakage magnetic flux between adjacent poles.

Each of the gaps (241) of the foregoing embodiments and variations may be displaced within a range where the gap (241) overlaps with the plane of the permanent magnets (220) projected in the axial direction. The gaps (241) do not need to be symmetric with respect to the radius, as illustrated in, for example, FIG. 16. The configurations of the gaps (241) described above may be appropriately combined.

Other Embodiments

The number of division of the rotor core (210), i.e., the number of the first and second rotor cores (240 and 250) described above is merely an example.

The first and second rotor cores (240 and 250) are not limited to multilayer cores (e.g., flat rolled magnetic steel sheets). For example, the first and second rotor cores (240 and 250) may be made of a pressed-powder magnetic material. In such a case, the rotor (200) may be configured by combining cores of different magnetic materials such that each first rotor core (240) is made of a pressed-powder magnetic material and each second rotor core (250) is made of a flat rolled magnetic steel sheet.

In the foregoing embodiments, the end plates (230) may be omitted. The end plates (230) for preventing detachment of magnets are made of a non-magnetic material or a magnetic material. In these cases, the use of a non-magnetic material can lead to a cost increase, and the use of a magnetic material can cause a leakage of a magnet magnetic flux. Thus, omission of the end plates (230) can reduce the cost and/or increase the torque, advantageously.

The present invention is applicable to generators as well as motors.

The present invention is also applicable to rotary electric machines with distributed winding of a coil around a stator core.

INDUSTRIAL APPLICABILITY

The present invention is useful for a rotor including a rotor core equipped with magnets and a rotary electric machine using such a rotor.

DESCRIPTION OF REFERENCE CHARACTERS 1 motor (rotary electric machine)
100 stator
110 stator core
120 coil
200 rotor
210 rotor core
211 magnet-housing slot
220 magnet
240 first rotor core
241 gap
250 second rotor core

The invention claimed is:

1. A rotor comprising:
a plurality of permanent magnets;
a first rotor core having a plurality of gaps penetrating the first rotor core along an axial direction; and
a second rotor core being in contact with an axial end of the first rotor core and having a plurality of magnet-housing slots associated with the gaps, wherein
the gaps are configured to have a magnetic resistance lower than that of the magnet-housing slots in such manner as to divert, upon application of an opposing magnetic field relative to said permanent magnets, a corresponding magnetic flux from said second rotor core to said first rotor core, and
along said axial direction, no portion of any of the permanent magnets in the rotor overlaps the first rotor core.

2. The rotor of claim 1, wherein
each of the gaps has a radial width smaller than a radial width of an associated one of the magnet-housing slots.

3. The rotor of claim 1, wherein
the first rotor core has an axial dimension smaller than that of the second rotor core.

4. The rotor of claim 1, wherein
the second rotor core is sandwiched between the first rotor cores in the axial direction.

5. The rotor of claim 1,
the first rotor core is sandwiched between the second rotor cores in the axial direction.

6. A rotary electric machine comprising;
the rotor of claim 1; and
a stator including a stator core around which a coil is wound.

7. The rotary electric machine of claim 6, wherein
each of the gaps has a radial width larger than that of an air gap between the rotor and the stator.

8. A rotor comprising:
a plurality of permanent magnets;
a first rotor core having a plurality of gaps penetrating the first rotor core along an axial direction; and
a second rotor core being in contact with an axial end of the first rotor core and having a plurality of magnet-housing slots associated with the gaps, wherein
the gaps are configured to have a magnetic resistance lower than that of the magnet-housing slots in such manner as to divert, upon application of an opposing magnetic field relative to said permanent magnets, a corresponding magnetic flux from said second rotor core to said first rotor core,
no portion of any of the permanent magnets is disposed in the plurality of gaps in the first rotor core, and
the plurality of permanent magnets are placed in the respective plurality of magnet-housing slots of the second rotor core so as to be spaced apart from the first rotor core in the axial direction by a predetermined distance.

* * * * *